(12) United States Patent
Tahara et al.

(10) Patent No.: US 11,745,185 B2
(45) Date of Patent: Sep. 5, 2023

(54) REAGENT CONTAINER AND AUTOMATIC ANALYZING SYSTEM

(71) Applicant: CANON MEDICAL SYSTEMS CORPORATION, Otawara (JP)

(72) Inventors: Hirotoshi Tahara, Nasushiobara (JP); Shin Iida, Ota-ku (JP); Shozo Hashimoto, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 310 days.

(21) Appl. No.: 16/908,811

(22) Filed: Jun. 23, 2020

(65) Prior Publication Data

US 2020/0406264 A1 Dec. 31, 2020

(30) Foreign Application Priority Data

Jun. 25, 2019 (JP) .................................. 2019-117026

(51) Int. Cl.
*B01L 3/00* (2006.01)
*G01N 21/03* (2006.01)

(52) U.S. Cl.
CPC ............... *B01L 3/52* (2013.01); *B01L 3/502* (2013.01); *G01N 21/03* (2013.01)

(58) Field of Classification Search
CPC . B01L 3/52; B01L 3/502; B01L 3/505; G01N 21/03; G01N 33/4875; G01N 2021/0364
See application file for complete search history.

(56) References Cited

U.S. PATENT DOCUMENTS

| | | | |
|---|---|---|---|
| 8,322,571 B2 | 12/2012 | Hovinen et al. | |
| 9,927,453 B2 | 3/2018 | Hirano et al. | |
| 2009/0212071 A1 | 8/2009 | Tom et al. | |
| 2013/0056112 A1 | 3/2013 | Hovinen et al. | |
| 2013/0301959 A1 | 11/2013 | Tom et al. | |
| 2015/0078685 A1 | 3/2015 | Tom et al. | |
| 2015/0298891 A1 | 10/2015 | Hovinen et al. | |
| 2017/0266664 A1* | 9/2017 | Lukhaub | G01N 35/1079 |
| 2021/0024866 A1* | 1/2021 | Hinojosa | C12M 29/00 |

FOREIGN PATENT DOCUMENTS

| | | |
|---|---|---|
| JP | 08-105900 A | 4/1996 |
| JP | 08-313535 A | 11/1996 |
| JP | 09-175540 A | 7/1997 |
| JP | 2002-053139 A | 2/2002 |
| JP | 2003-514218 A | 4/2003 |
| JP | 2004-226314 A | 8/2004 |

(Continued)

OTHER PUBLICATIONS

Office Action dated Jan. 4, 2023, in Japanese Patent Application No. 2019-117026, 6 pages.

*Primary Examiner* — Rebecca C Bryant
(74) *Attorney, Agent, or Firm* — Oblon, McClelland, Maier & Neustadt, L.L.P.

(57) ABSTRACT

A reagent container according to an embodiment is used in an automatic analyzing system configured to measure a liquid mixture of a tested specimen and a reagent. The reagent container includes a case, a bag, and an outlet. The case is stored in a reagent storage. The bag is built in the case, is more flexible than the case, and is configured to contain the reagent. The reagent is taken out through the outlet.

7 Claims, 8 Drawing Sheets

(56) References Cited

FOREIGN PATENT DOCUMENTS

| | | | | |
|---|---|---|---|---|
| JP | 2006204529 | * | 1/2005 | ............ B65D 30/10 |
| JP | 2008-539146 A | | 11/2008 | |
| JP | 2014-211437 A | | 11/2014 | |
| JP | 2015-169623 A | | 9/2015 | |
| WO | WO 01/32828 A2 | | 5/2001 | |
| WO | WO-2021014642 A1 | * | 1/2021 | |

* cited by examiner

REAGENT CONTAINER AND AUTOMATIC ANALYZING SYSTEM

CROSS-REFERENCE TO RELATED APPLICATIONS

This application is based upon and claims the benefit of priority from Japanese Patent Application No. 2019-117026, filed on Jun. 25, 2019; the entire contents of which are incorporated herein by reference.

FIELD

Embodiments described herein relate generally to a reagent container and an automatic analyzing system.

BACKGROUND

In automatic analyzing systems, a reagent is dispensed by using a probe. For example, the probe is configured to aspirate the reagent from a reagent container held on a turntable and to dispense the reagent into a reaction cuvette into which a specimen has been pipetted. Some reagents contain an easily-foaming component such as a surfactant. For this reason, when a reagent is moved such as while the reagent container is transported or while the turntable is in a rotating motion after the reagent container is transported, bubbles may be generated as a result of the liquid surface of the reagent in the reagent container becoming rippled. To cope with this situation, an automatic analyzing system includes a liquid surface detecting function configured to detect a change in the capacitance when a reagent probe descends and plunges into a reagent so that the tip end of the probe is stopped at a certain depth from the liquid surface of the reagent. In the automatic analyzing system, when bubbles are generated due to the liquid surface of the reagent becoming rippled, because the liquid surface detecting function detects the bubbles above the reagent surface, the tip end of the probe may not reach the liquid surface or may be stopped at an inadequate depth, which may result in a vain attempt to aspirate the reagent or suction of the reagent in an insufficient amount. Accordingly, there is a possibility that, during the dispensing of the reagent, the probe may not be able to correctly dispense the reagent in an amount required for the measurement.

DETAILED DESCRIPTION

A reagent container according to an embodiment is used in an automatic analyzing system configured to measure a liquid mixture of a tested specimen and a reagent. The reagent container includes a case, a bag, and an outlet. The case is stored in a reagent storage. The bag is built in the case, is more flexible than the case, and is configured to contain the reagent. The reagent is taken out through the outlet.

Exemplary embodiments of an automatic analyzing system to which a reagent container is applied will be explained in detail below, with reference to the drawings. Possible embodiments are not limited to the embodiments described below. Further, the description of each of the embodiments is, in principle, applicable to any other embodiment.

First Embodiment

Figure 1:
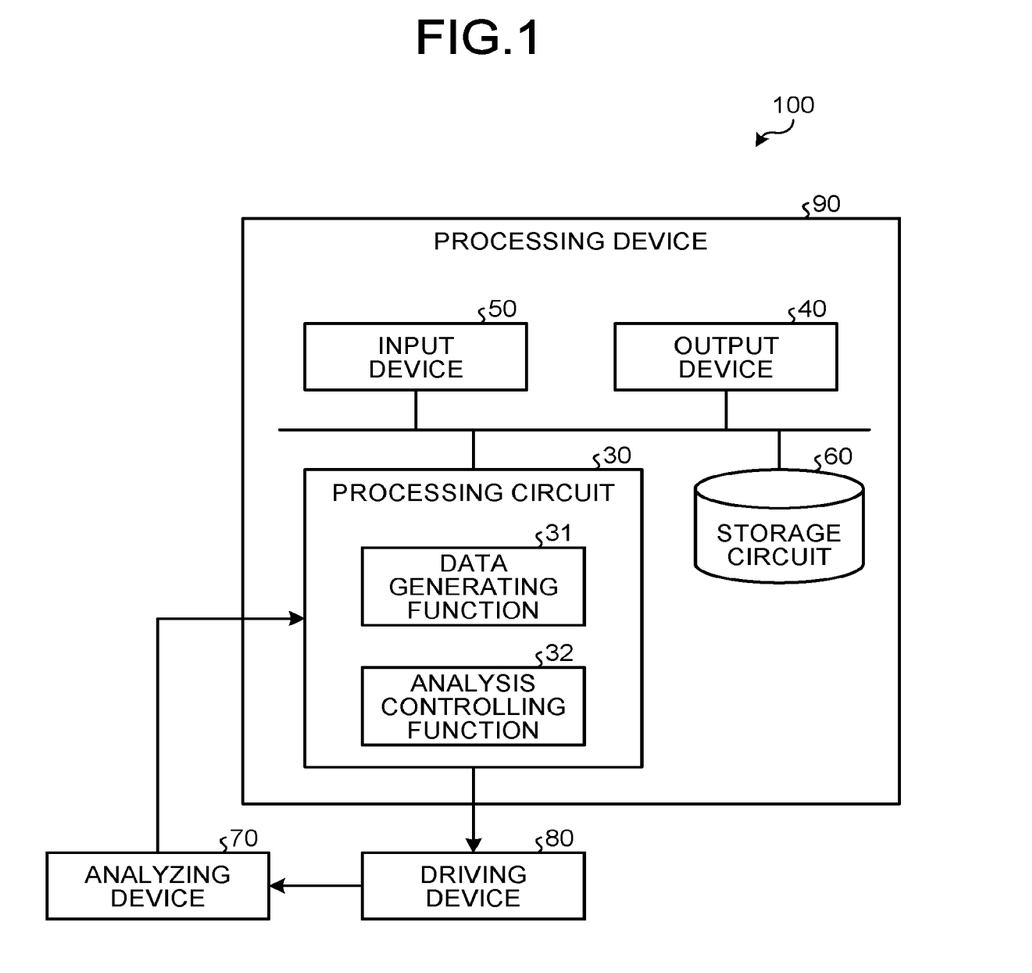
FIG. 1 is a block diagram illustrating an exemplary configuration of an automatic analyzing system to which a reagent container according to a first embodiment is applied.

FIG. 1 is a block diagram illustrating an exemplary configuration of an automatic analyzing system 100 to which a reagent container according to a first embodiment is applied. The automatic analyzing system 100 illustrated in FIG. 1 includes an analyzing device 70, a driving device 80, and a processing device 90.

The analyzing device 70 is configured to generate standard data and tested data, by measuring a liquid mixture of a standard specimen of test items and a tested specimen (a biological specimen such as blood or urine) acquired from an examined subject and a reagent used for analyzing the test items. The analyzing device 70 includes a plurality of units configured to dispense the specimens, to dispense the reagent, and the like. The driving device 80 is configured to drive the units of the analyzing device 70. The processing device 90 is configured to control the driving device 80 to bring the units of the analyzing device 70 into operation.

The processing device 90 includes an input device 50, an output device 40, a processing circuit 30, and a storage circuit 60.

The input device 50 includes input devices such as a keyboard, a mouse, a button, and/or a touch key panel and is configured to input information for setting analysis parameters of the test items, to input information for setting tested substance identification information of the tested specimens and the test items.

The output device 40 includes a printer and a display device. The printer is configured to print calibration data and analysis data generated by the processing circuit 30. The display device is a monitor such as a Cathode Ray Tube (CRT) or a liquid crystal panel and is configured to display the calibration data and the analysis data generated by the processing circuit 30.

The storage circuit 60 may be, for example, a semiconductor memory element such as a Random Access Memory (RAM) or a flash memory, or a storage device such as a hard disc or an optical disc.

The processing circuit 30 is configured to control the entire system. For example, as illustrated in FIG. 1, the processing circuit 30 executes a data generating function 31 and an analysis controlling function 32. The analysis controlling function 32 is configured to control the driving device 80 to bring the units of the analyzing device 70 into operation. The data generating function 31 is configured to generate the calibration data and the analysis data of the test items, by processing the standard data and the tested data generated by the analyzing device 70.

In this situation, for example, processing functions executed by the constituent elements of the processing circuit 30, i.e., the data generating function 31 and the analysis controlling function 32 are recorded in the storage circuit 60 in the form of computer-executable programs. The processing circuit 30 is a processor configured to realize the functions corresponding to the programs, by reading and executing the programs from the storage circuit 60. In other words, the processing circuit 30 that has read the programs has the functions illustrated within the processing circuit 30 in FIG. 1. In the present example, the data generating function 31 is an example of a data generating unit. The analysis controlling function 32 is an example of an analysis controlling unit.

Although FIG. 1 illustrates the example in which the single processing circuit (i.e., the processing circuit 30) realizes the processing functions described below, it is also acceptable to structure a processing circuit by combining together a plurality of independent processors, so that the functions are realized as a result of the processors executing the programs.

The term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). The one or more processors realize the functions by reading and executing the programs saved in the storage circuit 60. Further, instead of saving the programs in the storage circuit 60, it is also acceptable to directly incorporate the programs into the circuits of the one or more processors. In that situation, the processors realize the functions by reading and executing the programs incorporated in the circuits thereof. Further, the processors in the present embodiments do not each necessarily have to be structured as a single circuit. It is also acceptable to structure one processor by combining together a plurality of independent circuits so as to realize the functions thereof. Further, it is also acceptable to integrate two or more of the constituent elements illustrated in FIG. 1 in one processor, so as to realize the functions thereof.

Figure 2:
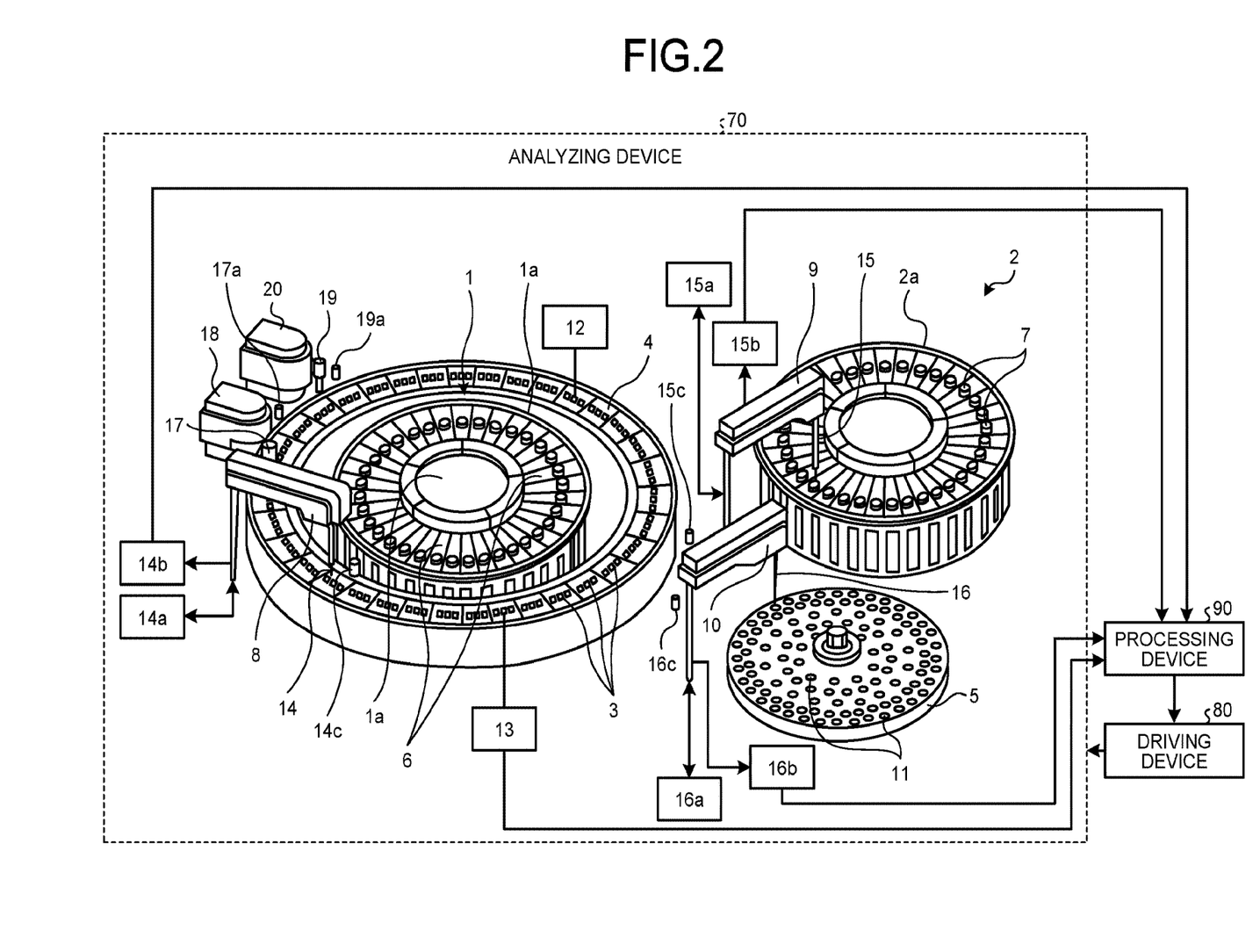
FIG. 2 is a perspective view illustrating an exemplary configuration of an analyzing device included in the automatic analyzing system in FIG. 1.

FIG. 2 is a perspective view illustrating an exemplary configuration of the analyzing device 70 included in the automatic analyzing system 100 in FIG. 1.

The analyzing device 70 includes a sample disk 5 configured to hold a plurality of specimen containers 11. The specimen containers 11 are configured to contain specimens such as a standard specimen of tested items and tested specimens.

Also, the analyzing device 70 further includes a plurality of reagent containers 6, a reagent storage 1 storing therein the plurality of reagent containers 6, a plurality of reagent containers 7, and a reagent storage 2 storing therein the plurality of reagent containers 7. Each of the reagent containers 6 is configured to contain a reagent including a component that reacts with a component of at least one of the test items contained in the specimens. For example, each of the reagent containers 6 is configured to contain a one-reagent system reagent or a first two-reagent system reagent. The reagent storage 1 includes a reagent rack 1a realized with a turntable rotatably holding the reagent containers 6 for the test items. Each of the reagent containers 7 is configured to contain a second two-reagent system reagent for the test items that is different from the reagent in the reagent containers 6. The reagent storage 2 includes a reagent rack 2a realized with a turntable rotatably holding the reagent containers 7 for the test items.

In this situation, the reagents are enclosed in the reagent containers 6 and 7 before being transported, so that the reagent containers 6 and 7 are transported while the bottle caps are closed. After being transported, the reagent containers 6 and 7 are stored in the reagent storages 1 and 2, respectively, while the bottle caps are open. For this reason, the reagent containers 6 and 7 are kept cool in the reagent storages 1 and 2, respectively, so as to prevent the reagents from deteriorating due to contact with the air.

In addition, the analyzing device 70 further includes: a plurality of reaction cuvettes 3 arranged on the circumference; and a reaction disk 4 configured to rotatably hold the plurality of reaction cuvettes 3.

Also, the analyzing device 70 further includes a specimen dispensing probe 16, a specimen dispensing arm 10, a specimen dispensing pump unit 16a, a specimen detector 16b, and a cleaning cup 16c. The specimen dispensing probe 16 is configured to dispense the specimen. More specifically, the specimen dispensing probe 16 aspirates the specimen in any of the specimen containers 11 held on the sample disk 5 with respect to each of the test items and dispenses the specimen in an amount set as an analysis parameter for the test item, into a reaction cuvette 3. The specimen dispensing arm 10 is configured to support the specimen dispensing probe 16 so as to be rotatable and movable in up-and-down directions. The specimen dispensing pump unit 16a is configured to cause the specimen dispensing probe 16 to aspirate and dispense any of the specimens. The specimen detector 16b is configured to detect the specimen in any of the specimen containers 11, as a result of a tip end part of the specimen dispensing probe 16 descending from above the liquid surface and diving into contact with the liquid surface of the specimen in the specimen container 11 held on the sample disk 5. For example, the specimen detector 16b is electrically connected to the specimen dispensing probe 16 and is configured to detect the specimen in any of the specimen containers 11, on the basis of a change in the capacitance that occurs when the tip end part of the specimen dispensing probe 16 dives into contact with the specimen in the specimen container 11. The cleaning cup 16c is configured to clean the specimen dispensing probe 16 every time the dispensing of a specimen is finished.

In addition, the analyzing device 70 further includes a reagent dispensing probe 14, a reagent dispensing arm 8, a reagent dispensing pump unit 14a, a reagent detector 14b, a cleaning cup 14c, a mixer 17, a mixing arm 18, and a cleaning cup 17a. The reagent dispensing probe 14 is configured to dispense the reagent in the reagent containers 6. More specifically, the reagent dispensing probe 14 aspirate the reagent in any of the reagent containers 6 corresponding to the test items and being held on the reagent rack 1a and dispenses the reagent in an amount set as an analysis parameter for the test item, into a reaction cuvette 3 in which one of the specimens has been dispensed. The reagent dispensing arm 8 is configured to support the reagent dispensing probe 14 so as to be rotatable and movable in up-and-down directions. The reagent dispensing pump unit 14a is configured to cause the reagent dispensing probe 14 to aspirate and dispense the reagent. As a liquid surface detecting function, the reagent detector 14b is configured to detect the reagent in any of the reagent containers 6, as a result of a tip end part of the reagent dispensing probe 14 descending from above the liquid surface and diving into contact with the liquid surface of the reagent in the reagent container 6 held on the reagent rack 1a. For example, the reagent detector 14b is electrically connected to the reagent dispensing probe 14 and is configured to detect the reagent in any of the reagent containers 6, on the basis of a change in the capacitance that occurs when the tip end part of the reagent dispensing probe 14 dives into contact with the reagent in the reagent container 6. The cleaning cup 14c is configured to clean the reagent dispensing probe 14 every time the dispensing of the reagent is finished. The mixer 17 is configured to stir the liquid mixture of the specimen and the reagent dispensed in any of the reaction cuvettes 3. The mixing arm 18 is configured to support the mixer 17 so as to be rotatable and movable in up-and-down directions. The cleaning cup 17a is configured to clean the mixer 17 at every stir of a liquid mixture.

Also, the analyzing device 70 further includes a reagent dispensing probe 15, a reagent dispensing arm 9, a reagent dispensing pump unit 15a, a reagent detector 15b, a cleaning cup 15c, a mixer 19, a mixing arm 20, and a cleaning cup 19a. The reagent dispensing probe 15 is configured to dispense the reagent in any of the reagent containers 7. In the present example, because the functions of the reagent dispensing probe 15, the reagent dispensing arm 9, the reagent dispensing pump unit 15a, the reagent detector 15b, the cleaning cup 15c, the mixer 19, the mixing arm 20, and the cleaning cup 19a are the same as those of the reagent dispensing probe 14, the reagent dispensing arm 8, the reagent dispensing pump unit 14a, the reagent detector 14b, the cleaning cup 14c, the mixer 17, the mixing arm 18, and the cleaning cup 17a, respectively, the explanations thereof will be omitted.

In addition, the analyzing device 70 further includes a measuring unit 13 and a reaction cuvette cleaning unit 12. The measuring unit 13 is configured to measure the liquid mixtures by radiating light onto any of the reaction cuvettes 3 containing the reaction liquid mixed by the mixer 17 and any of the reaction cuvettes 3 containing the reaction liquid mixed by the mixer 19. More specifically, the measuring unit 13 is configured to radiate light onto one of the rotating reaction cuvettes 3 in a measuring position and to detect, with the radiation, the light that has passed through the liquid mixture of a specimen and a reagent in the reaction cuvette 3. After that, the measuring unit 13 is configured to generate standard data or tested data expressed with a digital signal by processing a detected signal and to output the generated data to the processing circuit 30 of the processing device 90. The reaction cuvette cleaning unit 12 is configured to clean any of the reaction cuvettes 3 that has finished being measured by the measuring unit 13.

The driving device 80 is configured to drive the units of the analyzing device 70.

The driving device 80 includes a mechanism configured to drive the sample disk 5 of the analyzing device 70 and is configured to rotate the specimen containers 11. Further, the driving device 80 includes a mechanism configured to drive the reagent rack 1a of the reagent storage 1 and is configured to rotate the reagent containers 6. Also, the driving device 80 includes a mechanism configured to drive the reagent rack 2a of the reagent storage 2 and is configured to rotate the reagent containers 7. In addition, the driving device 80 includes a mechanism configured to drive the reaction disk 4 and is configured to rotate the reaction cuvettes 3.

Furthermore, the driving device 80 includes a mechanism configured to rotate and move in up-and-down directions, the specimen dispensing arm 10 and is configured to move the specimen dispensing probe 16 between the specimen containers 11 and the reaction cuvettes 3. Further, the driving device 80 includes a mechanism configured to drive the specimen dispensing pump unit 16a and is configured to cause the specimen dispensing probe 16 to dispense the specimens. In other words, the driving device 80 causes the specimen dispensing probe 16 to aspirate the specimen from any of the specimen containers 11 and to dispense the specimen into any of the reaction cuvettes 3.

Further, the driving device 80 includes a mechanism configured to rotate and move in up-and-down directions, the reagent dispensing arms 8 and 9 and is configured to move the reagent dispensing probes 14 and 15 to move between a corresponding one of the reagent containers 6 and 7 and any of the reaction cuvettes 3. Also, the driving device 80 includes a mechanism configured to drive the reagent dispensing pump units 14a and 15a and to cause the reagent dispensing probes 14 and 15 to dispense a corresponding one of the reagents. In other words, the driving device 80 causes the reagent dispensing probes 14 and 15 to aspirate the reagent in a corresponding one of the reagent containers 6 and 7 and to dispense the reagent into any of the reaction cuvettes 3. Further, the driving device 80 includes a mechanism configured to drive the mixing arms 18 and 20 and is configured to move the mixers 17 and 19 to the inside of any of the reaction cuvettes 3. In addition, the driving device 80 includes a mechanism configured to drive the mixers 17 and 19 and is configured to cause the specimen and the reagent in any of the reaction cuvettes 3 to be mixed.

The analysis controlling function 32 of the processing device 90 is configured to control the driving device 80 to bring the units of the analyzing device 70 into operation.

An overall configuration of the automatic analyzing system 100 to which the reagent container according to the first embodiment is applied has thus been explained. The reagent container according to the first embodiment structured as described above is configured to inhibit the generation of reagent bubbles when any of the reagents is moved such as while any of the reagent containers is transported or while any of the turntables (e.g., the reagent storages 1 and 2) is in a rotating motion after the reagent container is transported.

As explained above, some reagents contain an easily-foaming component such as a surfactant. For this reason, when a reagent is moved such as while either of the reagent containers 6 and 7 is transported or while the turntable is in a rotating motion after either of the reagent containers 6 and 7 is transported, bubbles may be generated as a result of the liquid surface of the reagents in the reagent containers 6 and 7 becoming rippled. To cope with this situation, the automatic analyzing system 100 includes the liquid surface detecting function (e.g., the reagent detectors 14b, 15b) configured to detect a change in the capacitance when either of the reagent dispensing probes 14 and 15 descends and plunges into the reagent so that the tip end of the probe is stopped at a certain depth from the liquid surface of the reagent. In the automatic analyzing system 100, when bubbles are generated due to the liquid surface of the reagents becoming rippled, because the liquid surface detecting function detects the bubbles above the reagent surface, the tip end of the probe may not reach the liquid surface or may be stopped at an inadequate depth, which may result in a vain attempt to aspirate the reagent or suction of the reagent in an insufficient amount. Accordingly, there is a possibility that, during the dispensing of either of the reagents, the probe may not be able to correctly dispense the reagent in an amount required. For this reason, it is necessary to inhibit the generation of reagent bubbles when the reagents are moved.

To cope with this situation, the reagent container according to the first embodiment is a reagent container to be used in the automatic analyzing system 100 configured to measure a liquid mixture of a tested specimen and a reagent, and the reagent container includes a case, a bag part, and an outlet. The case is stored in a turntable of the automatic analyzing system 100. The bag part is built in the case, is more flexible than the case, and is configured to contain the reagent. The reagent is taken out through the outlet. More specifically, the reagent container according to the first embodiment further includes a barrel part. The barrel part is attached to the bag part. A probe configured to aspirate the agent contained in the bag part is inserted from a first end of the barrel part serving as the outlet. In this situation, the bag part becomes deflated in conjunction with the probe aspirating the reagent.

Next, a reagent container 200 according to the first embodiment will be explained, with reference to FIGS. 3 to 6. In the present example, the reagent container 200 according to the first embodiment corresponds to either of the reagent containers 6 and 7 in FIG. 2, for instance.

Figure 3:
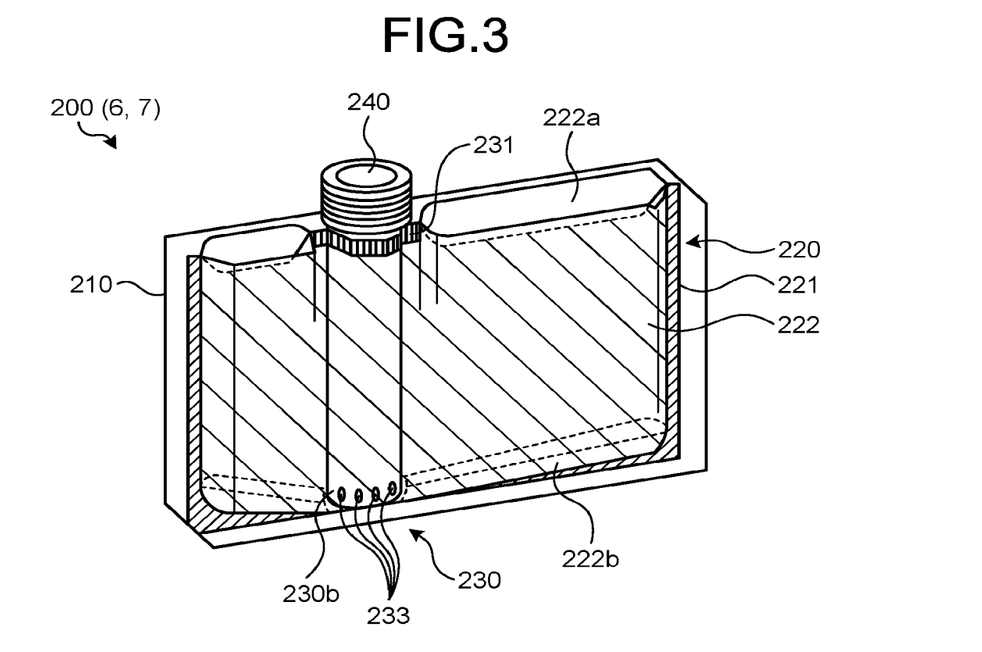
FIG. 3 is a perspective view illustrating an exemplary configuration of the reagent container according to the first embodiment.
Figure 4:
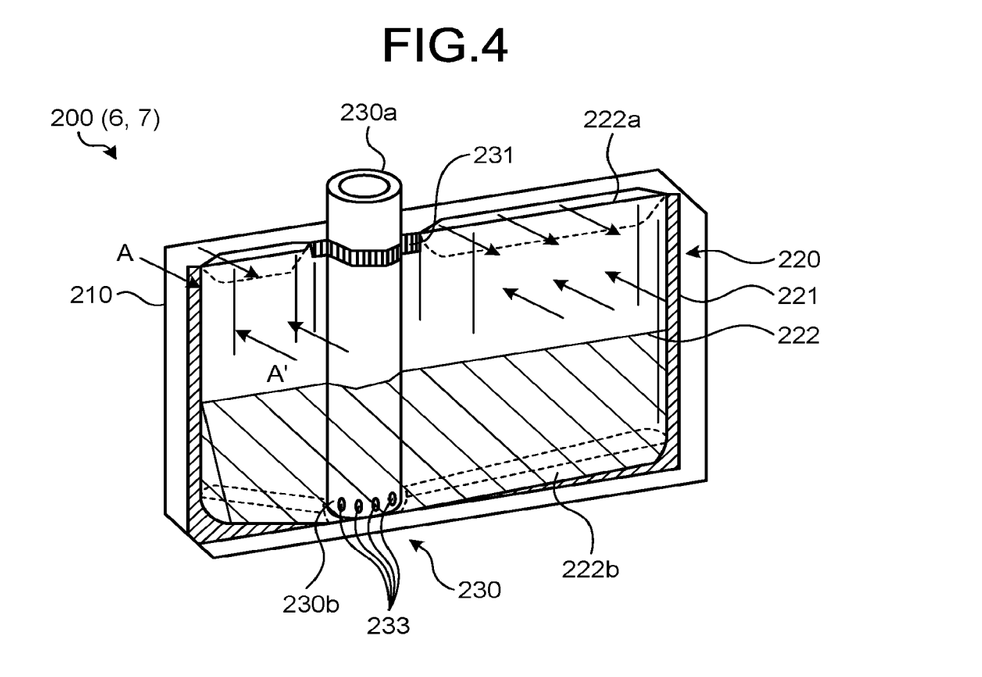
FIG. 4 is another perspective view illustrating the exemplary configuration of the reagent container according to the first embodiment.

As illustrated in FIG. 3, the reagent container 200 according to the first embodiment includes a case 210, a bag part 220 built in the case 210, and a barrel part 230 attached to the bag part 220. As illustrated in FIG. 4, while a cap 240 provided on a first end 230a side of the barrel part 230 is removed, a probe configured to aspirate out the reagent contained the bag part 220 is inserted in the barrel part 230, from the first end 230a side. In the present example, the probe corresponds to either of the reagent dispensing probes 14 and 15 in FIG. 2.

The bag part 220 is formed by using a material more flexible than that of the case 210 and may be formed by using a resin film, for example. The material of the bag part 220 may be, for example, a polymer material selected from a group consisting of polyethylene, polytetrafluoroethylene, polypropylene, polyurethane, polyvinylidene chloride (PVDC), polyvinyl chloride (PVC), polyacetal, polystyrene, polyacrylonitrile, and polybutylene. The bag part 220 is formed by using a film (the resin film) of the selected polymer material.

For example, the bag part 220 may be formed by using a first resin film and a second resin film. More specifically, the bag part 220 is structured by joining the first resin film and the second resin film together, so that surfaces of the first and the second resin films face each other. To join the first resin film and the second resin film together, thermal fusion may be used, for example. As illustrated in FIG. 3, the bag part 220 has: a seal part 221 formed by thermally fusing the first resin film and the second resin film together; and a fillable part 222 enclosed by the seal part 221. The fillable part 222 serves as a container to contain a reagent.

As illustrated in FIG. 3, the bag part 220 is creased. For example, the crease is formed in an upper part 220a of the bag part 220. When a probe aspirates out a reagent so that the reagent contained in the bag part 220 is ejected from the bag part 220 via the barrel part 230, the amount of the reagent becomes smaller. In conjunction therewith, as illustrated in FIG. 4, the position of the liquid surface of the reagent contained in the bag part 220 descends, and the bag part 220 having the crease becomes deflated. For example, the bag part 220 having the crease becomes deflated in the directions indicated by the arrows A and A' in FIG. 4.

Figure 5:
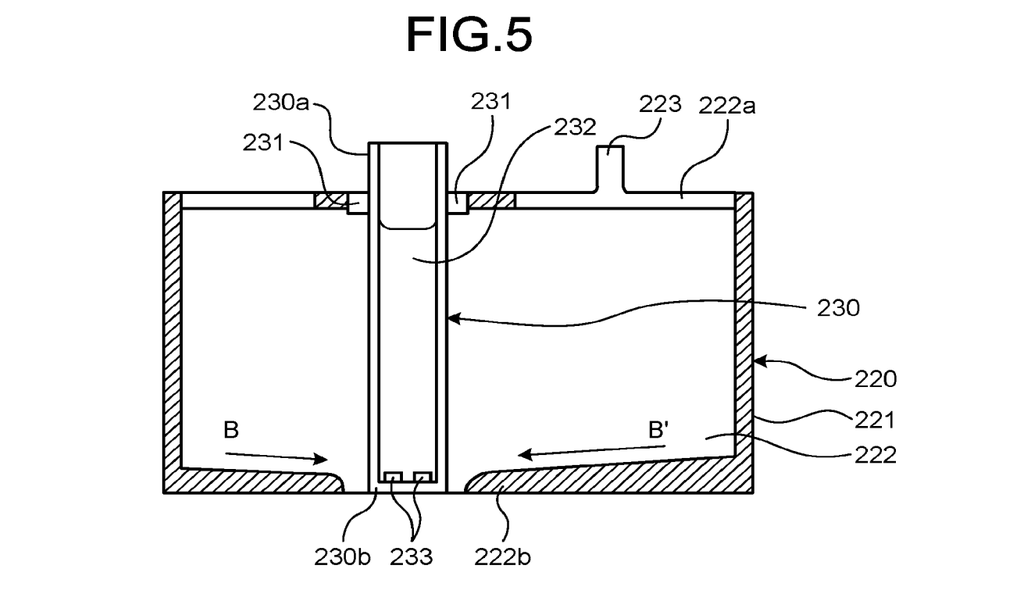
FIG. 5 is a cross-sectional view illustrating the exemplary configuration of the reagent container according to the first embodiment.
Figure 6:
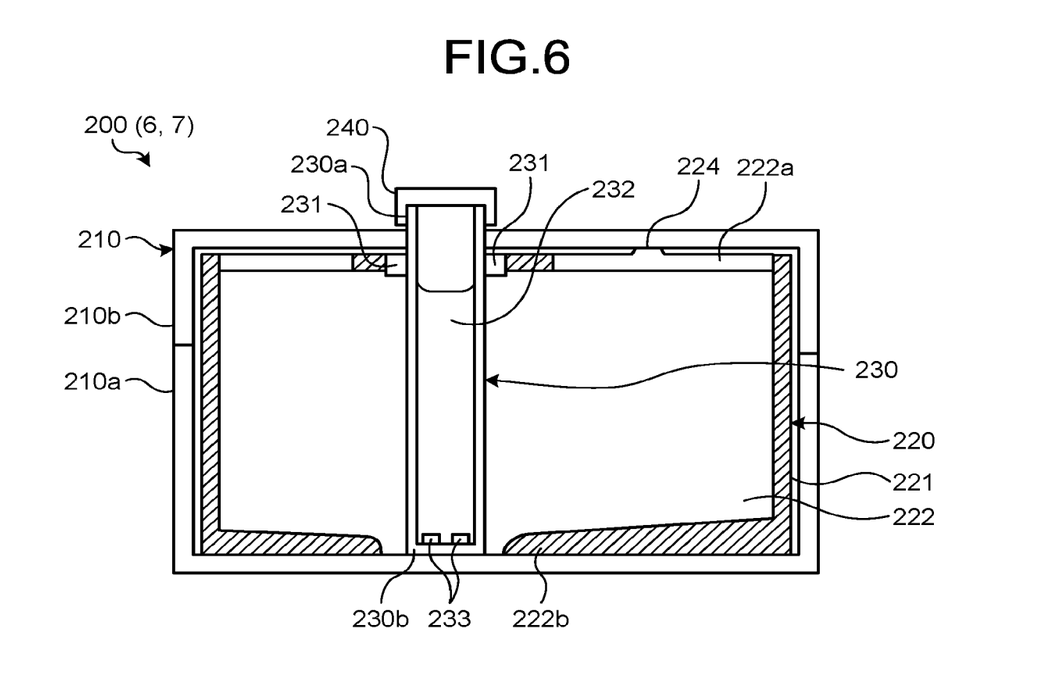
FIG. 6 is another cross-sectional view illustrating the exemplary configuration of the reagent container according to the first embodiment.

As illustrated in FIG. 5, the bag part 220 is provided with an air releasing part 223 configured to exhaust the air from the inside of the bag part 220 when the bag part 220 is filled with a reagent. For example, the air releasing part 223 is provided in one location at the upper part 220a of the bag part 220. After the bag part 220 is filled with the reagent, the air releasing part 223 is sealed by thermal fusion, for example. More specifically, as illustrated in FIG. 6, the bag part 220 has a part 224 in which the air releasing part 223 is sealed.

As illustrated in FIGS. 3 to 6, the barrel part 230 is hollow, has a circular cylindrical shape, and is formed by using resin. The material of the barrel part 230 may be, for example, a polymer material selected from a group consisting of polyethylene, polytetrafluoroethylene, polypropylene, polyurethane, polyvinylidene chloride, polyvinyl chloride, polyacetal, polystyrene, polyacrylonitrile, and polybutylene. The barrel part 230 is formed by using the selected polymer material (the resin).

As illustrated in FIGS. 3 to 6, the barrel part 230 is provided so as to stand in the bag part 220 along the insertion direction of the probe. More specifically, the first end 230a side of the barrel part 230 is exposed from the bag part 220, whereas the second end 230b side of the barrel part 230 is arranged in a central part of a bottom part 222b of the bag part 220. In the central part of the upper part 220a of the bag part 220, an attachment part 231 for having the barrel part 230 attached within the bag part 220 is provided on the outer circumferential surface of the barrel part 230. The attachment part 231 is structured as plate-like parts extending along the resin film of the bag part 220. For example, the attachment part 231 is thermally fused with the resin film of the bag part 220 when the barrel part 230 is attached to the bag part 220.

As illustrated in FIGS. 3 to 6, the barrel part 230 is provided with penetrating holes 233. The holes 233 are formed in a lateral face of the barrel part 230 positioned on the second end 230b side and allow the reagent to flow between an interior 232 of the barrel part 230 and the inside of the bag part 220. The second end 230b of the barrel part 230 is the end part that is positioned opposite from the first end 230a of the barrel part 230 and in which the probe is not to be inserted. The bag part 220 is filled with a reagent entering via the interior 232 and the holes 233, from the first end 230a side of the barrel part 230. Further, the reagent contained in the bag part 220 is aspirated out by the probe via the interior 232.

As illustrated in FIGS. 3 to 6, the bottom part 222b of the bag part 220 is sloped so as to approach the installation surface of the reagent storage, toward the second end 230b of the barrel part 230. For example, the bottom part 222b of the bag part 220 is sloped in the directions indicated by the arrows B and B' in FIG. 5. In other words, the bottom part 222*b* of the bag part 220 is shaped so that the reagent flows into the interior 232 through the holes 233 of the barrel part 230, in conjunction with the decrease of the reagent caused when the probe aspirates out the reagent.

As for the position in which the barrel part 230 stands within the bag part 220 along the insertion direction of the probe, it is preferable to position the barrel part 230 in the vicinity of the central part of the bag part 220, and not on a lateral face of the bag part 220. For example, when the driving device 80 illustrated in FIG. 2 causes the reagent container 200 to rotate on the rotation axis of the reagent storage by driving the reagent rack of the reagent storage, the liquid surface of the reagent in the reagent container 200 is, due to centrifugal force, the highest on the radially outer side positioned distant from the rotation axis and is the lowest on the radially inner side positioned close to the rotation axis. In this situation, if the barrel part 230 were arranged on the radially outer side of the bag part 220, although the position would be closer to the probe, because the liquid surface of the reagent in the reagent container 200 would rise due to centrifugal force, bubbles would easily is generated due to ripples, which is not desirable. To cope with this situation, it is preferable to arrange the barrel part 230 to stand in a position shifted from the central part of the bag part 220 toward the radially outer side, in consideration of the effect achieved by sloping the bottom part 222*b* of the bag part 220 and the positional relationship between the barrel part 230 and the probe.

The case 210 is formed by using a material harder than that of the bag part 220. For example, the case 210 is formed by using metal or a polymer material.

As illustrated in FIGS. 3 and 6, the case 210 has the bag part 220 built therein. For example, the case 210 is structured with casings 210*a* and 210*b*. The casing 210*a* is structured with lateral face parts and a bottom face part integrally formed with the lateral face parts. On the inside of the casing 210*a*, the bag part 220 integrally formed with the barrel part 230 is provided. The casing 210*b* is structured with lateral face parts and a top face part integrally formed with the lateral face parts and is arranged over the casing 210*a*. A penetrating hole is formed in a central part of the top face part of the casing 210*b*. For example, when the casing 210*a* provided with the bag part 220 integrally formed with the barrel part 230 is locked with the casing 210*b* arranged over the casing 210*a* by using a locking mechanism (not illustrated), the bag part 220 is built in the casings 210*a* and 210*b*, so that the first end 230*a* side of the barrel part 230 is exposed through the hole formed in the top face part of the casing 210*b*. The detachable cap 240 is provided on the first end 230*a* side of the barrel part 230 being exposed.

Figure 7:
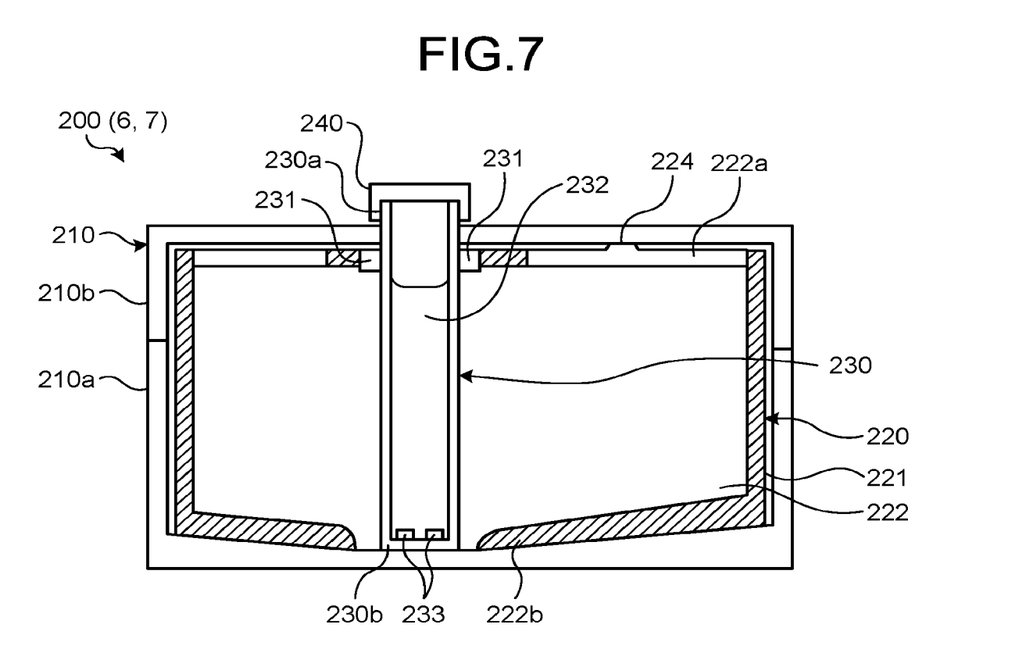
FIG. 7 is yet another cross-sectional view illustrating the exemplary configuration of the reagent container according to the first embodiment.

In this situation, in FIGS. 3 to 6, the bottom part 222*b* of the bag part 220 is sloped within the bag part 220 so that the sections on the second end 230*b* side of the barrel part 230 approach the installation surface of the reagent storage; however, possible configurations are not limited to this example. For instance, as illustrated in FIG. 7, the bottom face part of the case 210 (the bottom face part of the casing 210*a* in the present example) may be sloped within the bag part 220, so as to approach the installation surface of the reagent storage toward the second end 230*b* of the barrel part 230. In other words, the bottom face part of the case 210 may be shaped so that the reagent flows into the interior 232 through the holes 233 of the barrel part 230, in conjunction with the decrease of the reagent caused when the probe aspirates out the reagent.

As explained above, the reagent container 200 according to the first embodiment is configured to inhibit the generation of reagent bubbles when the reagent is moved such as while the reagent container 200 is transported or while the turntable is in a rotating motion after the reagent container 200 is transported. More specifically, because the reagent is contained in the bag part 220 formed by using the resin film that is a flexible material, bubbles are not easily caused by ripples on the liquid surface of the reagent at the time of the transport.

Further, in the reagent container 200 according to the first embodiment, because the reagent is contained in the bag part 220 formed by using the flexible material, when the reagent is aspirated out by the probe, the reagent is ejected from the bag part 220 via the barrel part 230, and the position of the liquid surface of the reagent contained in the bag part 220 therefore descends. In conjunction therewith, the bag part 220 becomes deflated, and the air does not easily flow into the bag part 220. As a result, according to the present embodiment, it is possible to prevent the air from diving into contact with the reagent, which prolongs the life of the reagent.

Further, the reagent container 200 according to the first embodiment has such a structure that makes it easy to be set on a turntable after the reagent container 200 is transported. More specifically, at the time of transporting the reagent container 200, because the barrel part 230 is integrally formed with the case 210 to be stored in the turntable of the automatic analyzing system 100 and because the case 210 has built therein the bag part 220 containing the reagent, it is possible to easily set the reagent container 200 on the turntable after the transport.

Second Embodiment

With the configurations described below, the reagent container 200 according to a second embodiment is configured to maintain the position of the liquid surface of a reagent in the barrel part 230, against the fall of the position of the liquid surface of the reagent contained in the bag part 220.

The reagent container 200 according to the second embodiment will be explained below, with reference to FIGS. 8 to 11.

Figure 8:
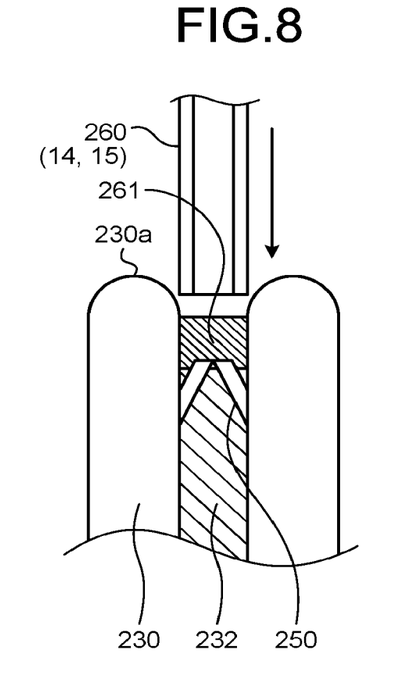
FIG. 8 is a cross-sectional view illustrating an exemplary configuration of a barrel part of a reagent container according to a second embodiment.

As illustrated in FIG. 8, the barrel part 230 is a tube that is flexible and has an inside diameter smaller than the outside diameter of a probe 260. In this situation, the probe 260 corresponds to either of the reagent dispensing probes 14 and 15 in FIG. 2. Provided on the first end 230*a* side of the barrel part 230 is a one-way valve 250 configured to prevent inflows in the insertion direction of the probe 260. While the one-way valve 250 is closed, the position of the liquid surface of the reagent in the barrel part 230 is maintained on the one-way valve 250. For example, on the one-way valve 250 in the barrel part 230, a reagent 261 is present in the amount illustrated in FIG. 8. For example, as a result of the processing device 90 illustrated in FIGS. 1 and 2 controlling the driving device 80, the probe 260 is moved to a predetermined position above the first end 230*a* of the barrel part 230 as illustrated in FIG. 8, so as to cause the tip end part of the probe 260 to descend from the predetermined position above the first end 230*a* of the barrel part 230.

Figure 9:
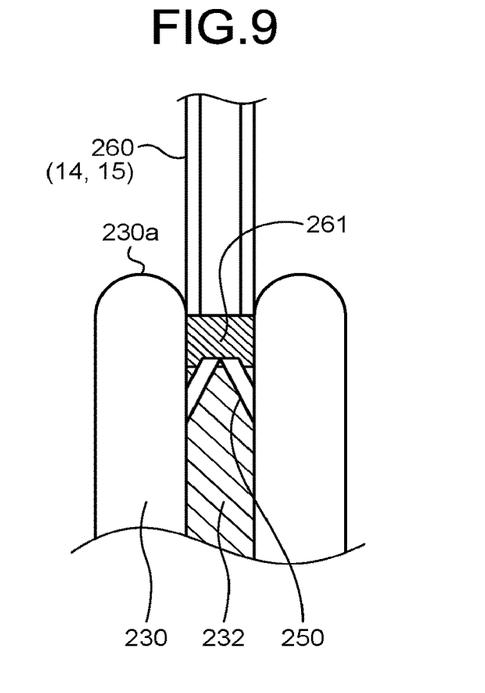
FIG. 9 is another cross-sectional view illustrating the exemplary configuration of the barrel part of the reagent container according to the second embodiment.
Figure 10:
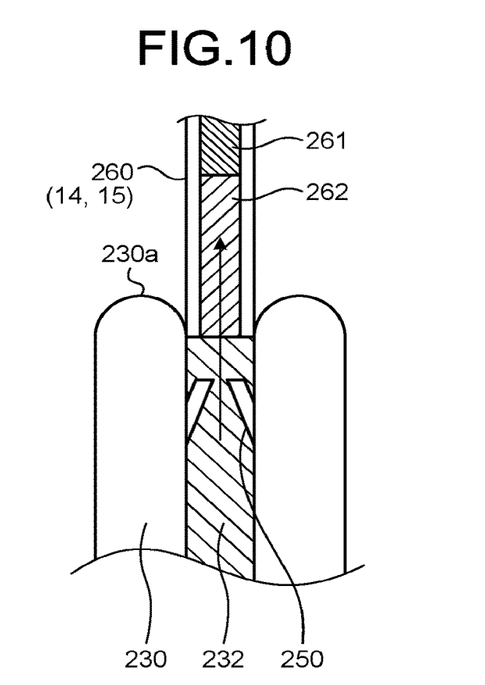
FIG. 10 is another cross-sectional view illustrating the exemplary configuration of the barrel part of the reagent container according to the second embodiment.

In this situation, as illustrated in FIG. 9, as a result of the tip end part of the probe 260 diving into contact with the reagent in the reagent container 200, a detector detects the reagent (e.g., the reagent 261) in the reagent container 200. In this situation, the detector corresponds to either of the reagent detectors 14*b* and 15*b* in FIG. 2. Further, in the position where the reagent is detected, the reagent is aspirated by the probe 260. In this situation, as illustrated in FIG. 10, because of the suction by the probe 260, the one-way valve 250 opens, so that the certain amount of reagent 261 that is present on the one-way valve 250 and the predetermined amount of reagent 262 are aspirated into the probe 260.

Figure 11:
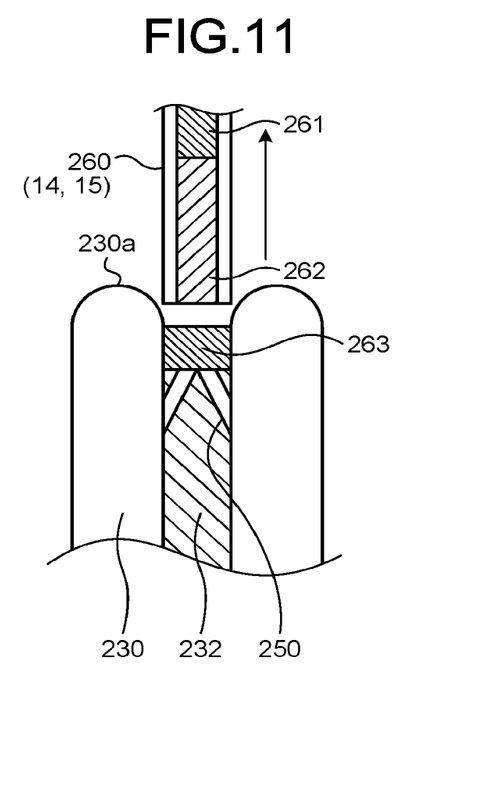
FIG. 11 is yet another cross-sectional view illustrating the exemplary configuration of the barrel part of the reagent container according to the second embodiment.

The predetermined amount of reagent 262 is more than the certain amount of reagent 261 that was present on the one-way valve 250. Further, the predetermined amount of reagent 262 is more than the amount set as an analysis parameter for the test item. Further, for example, as a result of the processing device 90 illustrated in FIGS. 1 and 2 controlling the driving device 80, the tip end part of the probe 260 is raised, as illustrated in FIG. 11, so that the probe 260 is moved to a predetermined position above the reaction disk 4 illustrated in FIG. 2. Subsequently, as a result of the processing device 90 illustrated in FIG. 2 controlling the driving device 80, the tip end part of the probe 260 is lowered from the predetermined position above the reaction disk 4, so that, out of the predetermined amount of reagent 262 aspirated by the probe 260, the reagent in the amount set as the analysis parameter of the test item is dispensed into the reaction cuvette 3 illustrated in FIG. 2. The reagent 261 and a certain amount of reagent from the predetermined amount of reagent 262 that has not been dispensed into the reaction cuvette 3 are discarded, and the probe 260 is cleaned by the cleaning cup. In the present example, the cleaning cup corresponds to either of the cleaning cups 14c and 15c illustrated in FIG. 2, for example.

Further, as illustrated in FIG. 11, by closing, the one-way valve 250 is configured to maintain the position of the liquid surface of the reagent in the barrel part 230 on the one-way valve 250. For example, on the one-way valve 250 in the barrel part 230, reagent 263 is present in an amount equal to that of the reagent 261 illustrated in FIG. 8.

As explained above, by using the configurations described above, the reagent container 200 according to the second embodiment is able to maintain the position of the liquid surface of the reagent in the barrel part 230, against the fall of the position of the liquid surface of the reagent contained in the bag part 220. Further, with regard to the reagent container 200 according to the second embodiment, the bottom part 222b of the bag part 220 does not necessarily have to be sloped. Also, the position in which the barrel part 230 stands does not necessarily have to be in the vicinity of the central part of the bag part 220.

Further, similarly to the first embodiment, the reagent container 200 according to the second embodiment has the double structure of which the interior is the bag. For example, similarly to the example in FIG. 3, the reagent container 200 includes the case 210 and the bag part 220 built in the case 210, while the bag part 220 is formed by using a material more flexible than that of the case 210. As explained herein, because the reagent container 200 according to the second embodiment is configured to contain the reagent in the bag part 220 formed by using the flexible material, bubbles are not easily caused by ripples on the liquid surface of the reagent, when the reagent is moved such as while the reagent container 200 is transported or while the turntable is in a rotating motion after the reagent container 200 is transported. Further, because the reagent container 200 according to the second embodiment is configured to contain the reagent in the bag part 220 formed by using the flexible material, when the reagent is aspirated out by the probe, the reagent is ejected from the bag part 220 via the barrel part 230, and the position of the liquid surface of the reagent contained in the bag part 220 therefore descends.

In conjunction therewith, the bag part 220 becomes deflated, and the air does not easily flow into the bag part 220. As a result, similarly to the first embodiment, it is possible, in the second embodiment, to prevent the air from diving into contact with the reagent and to thus prolong the life of the reagent.

Other Embodiments

The first and the second embodiments have thus been explained. It is also possible to carry out the present disclosure in various different modes other than those in the first and the second embodiments described above.

In the embodiments above, the barrel part 230 of the reagent container 200 is hollow and has a circular cylindrical shape in FIGS. 3 to 6; however, possible embodiments are not limited to this example. As mentioned above, it is sufficient when the barrel part 230 is shaped to be hollow. For example, the barrel part 230 may be in the shape of a polygonal prism of which the opening is polygonal such as triangular or rectangular.

In the embodiments above, the case 210 and the bag part 220 of the reagent container 200 are each in the shape of a rectangular prism of which the bottom face and the lateral faces are rectangular in FIGS. 3 to 6; however, possible embodiments are not limited to this example. As mentioned above, it is sufficient when the bag part 220 is formed by using a material more flexible than that of the case 210 and is configured to be able to contain the reagent. For example, the case 210 and the bag part 220 may each have a columnar shape of which the bottom face has an arbitrary shape. For example, the case 210 and the bag part 220 may each be in the shape of a triangular prism. Alternatively, the case 210 and the bag part 220 may each have a columnar shape of which the bottom face is fan-shaped.

In the embodiments above, the example was explained in which the first end side of the barrel part 230 protruding from the reagent container 200 is used as the outlet through which the reagent is taken out; however, possible embodiments are not limited to this example. The outlet does not necessarily have to protrude from the reagent container. For instance, the above embodiments are applicable to an example in which a dispensing mechanism as illustrated in FIG. 12 is provided.

Figure 12:
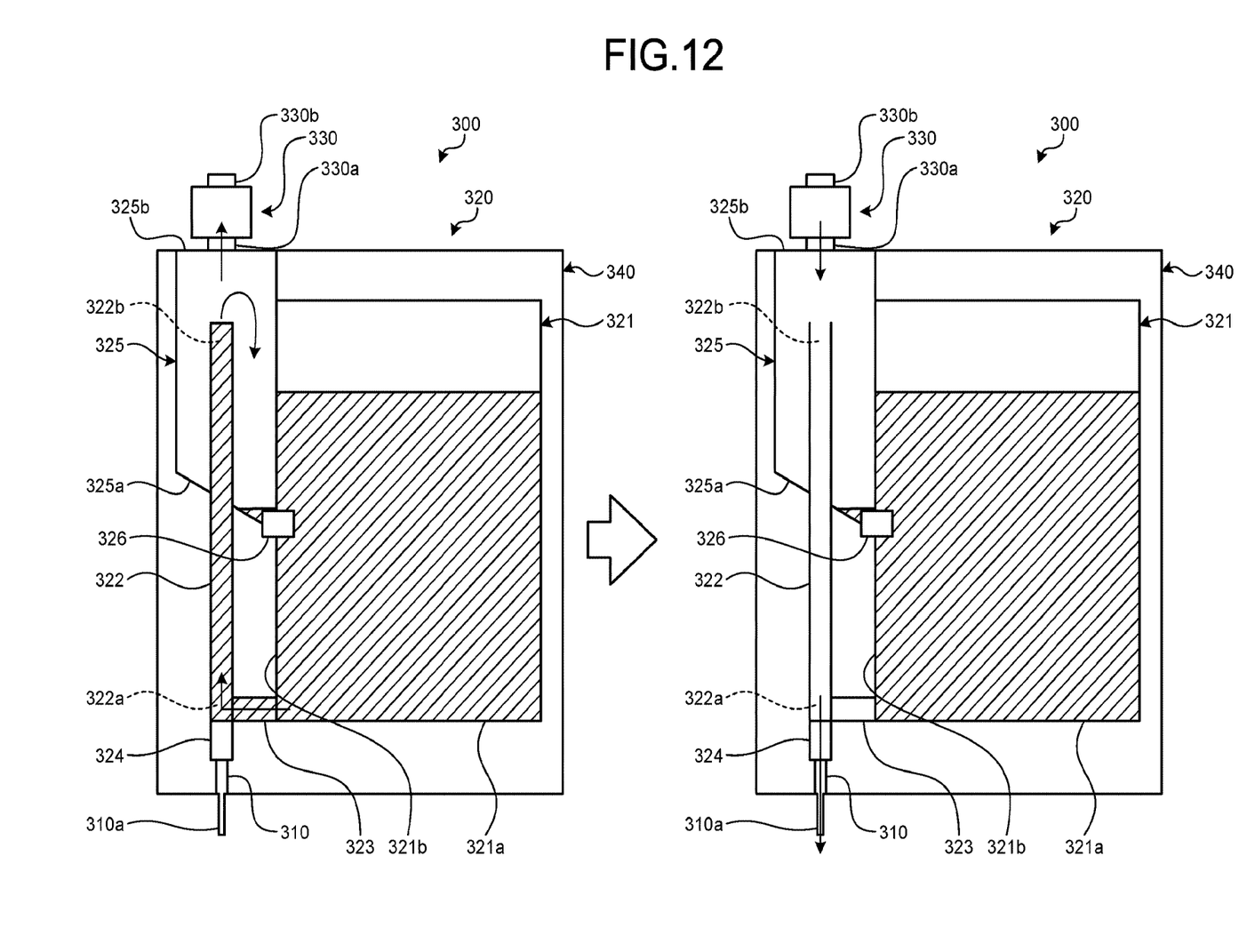
FIG. 12 is a cross-sectional view illustrating an exemplary configuration of a reagent cartridge serving as a reagent container according to a modification example.

As illustrated in FIG. 12, as a reagent container according to a modification example, a reagent cartridge 300 includes a case 340 as well as a reagent supply probe 310 and a reagent supply unit 320 built in the case 340. The reagent supply unit 320 includes a container 321, a cylinder 322, one-way valves 323 and 324, a container 325, and an electromagnetic valve 326. The reagent supply probe 310, the cylinder 322, and the one-way valves 323 and 324 correspond to the dispensing mechanism.

The container 321 is configured to contain a reagent. In the present example, the container 321 corresponds to the reagent container 200 in the above embodiments and includes, for example, the case 210 and the bag part 220 built in the case 210 described in the above embodiments. In other words, the container 321 does not include the barrel part 230 of the above embodiments.

The one-way valve 323 is provided between a lateral face of the cylinder 322 positioned on a tip end 322a side and a lateral face of the container 321 positioned on a bottom face part 321a side. The one-way valve 324 is provided between the tip end 322a of the cylinder 322 and the second end part side opposite from a tip end part 310a of the reagent supply probe 310. A basal end 322b opposite from the tip end 322a of the cylinder 322 penetrates a bottom face part 325a of the container 325 and is stored inside the container 325. The electromagnetic valve 326 is provided in a region where the bottom face part 325a of the container 325 intersects a lateral face part 321b of the container 321 and is configured to connect the container 325 and the container 321 to each other when opened.

An example of a process using the reagent cartridge 300 will be explained, with reference to FIG. 12.

First, when dispensing a reagent, a terminal 330b of a reagent supply pump unit 330 is connected to an arm configured to movably support the reagent supply pump unit 330. For example, the analysis controlling function 32 of the processing device 90 outputs, to the driving device 80, a control signal to connect the reagent cartridge 300 that dispenses the reagent to the reagent supply pump unit 330. In this situation, in response to the control signal, the driving device 80 moves the arm movably supporting the reagent supply pump unit 330, so as to connect, as illustrated in FIG. 12, a top face part 325b of the container 325 of the reagent supply unit 320 in the reagent cartridge 300 to a pump head 330a of the reagent supply pump unit 330. More specifically, an opening is formed in the top face part of the case 340, so that the top face part 325b of the container 325 is exposed through the opening. Further, the exposed top face part 325b has a penetrating hole formed therein, so that, for example, a rubber O-ring is provided around the hole. Further, as a result of the O-ring being covered or gripped by the pump head 330a, the top face part 325b of the container 325 is connected to the pump head 330a. The opening formed in the top face part of the case 340 is an example of the outlet.

Subsequently, for example, the analysis controlling function 32 of the processing device 90 outputs, to the driving device 80, a control signal to cause the reagent supply pump unit 330 to aspirate a medium for causing the reagent cartridge 300 to aspirate a predetermined amount of reagent. In this situation, in response to the control signal, the driving device 80 drives the reagent supply pump unit 330 and controls the reagent supply pump unit 330 to aspirate the medium from the pump head 330a. For example, the terminal 330b of the reagent supply pump unit 330 is provided with a pipe configured to dispense the medium from the driving device 80 to the reagent cartridge 300 via the arm and to aspirate the medium from the reagent cartridge 300 into the driving device 80 via the arm. Further, the terminal 330b of the reagent supply pump unit 330 is connected to a signal line used by the driving device 80 to control the reagent supply pump unit 330 via the arm. In response to the control signal, the driving device 80 controls, via the signal line, the reagent supply pump unit 330 so as to aspirate the medium from the pump head 330a via the pipe. In this situation, the medium is aspirated by the reagent supply pump unit 330, at the basal end 322b positioned opposite from the tip end 322a of the cylinder 322 stored inside the container 325. As a result, as illustrated in FIG. 12, the reagent flows into the cylinder 322 from the container 321 via the one-way valve 323.

In this situation, the predetermined amount of reagent is slightly more than the amount set as the analysis parameter of the test item. For this reason, as illustrated in FIG. 12, when the reagent flows into the cylinder 322 from the container 321 via the one-way valve 323, the reagent flows into the cylinder 322 in the amount set as the analysis parameter of the test item, and also, the reagent slightly overflowing from the basal end 322b of the cylinder 322 is contained in the container 325. In this situation, because the bottom face part 325a of the container 325 is sloped, the reagent flows toward the lateral face part side of the container 321 within the container 325.

Subsequently, the analysis controlling function 32 of the processing device 90 outputs, to the driving device 80, a control signal to cause a medium for discharging the reagent to be injected from the reagent supply pump unit 330 to the reagent cartridge 300. In this situation, in response to the control signal, the driving device 80 drives the reagent supply pump unit 330 and controls the reagent supply pump unit 330 to pump out the medium from the pump head 330a. For example, in response to the control signal, the driving device 80 controls, via the signal line, the reagent supply pump unit 330, so as to pump out the medium from the pump head 330a via the pipe. In this situation, from the basal end 322b of the cylinder 322 stored inside the container 325, the medium is pumped out by the reagent supply pump unit 330. As a result, as illustrated in FIG. 12, the reagent that has flowed into the cylinder 322 is dispensed from the reagent supply probe 310 via the one-way valve 324.

In this situation, by using the electromagnetic valve 326, it is possible to return the reagent contained in the container 325 to the container 321. More specifically, the electromagnetic valve 326 includes a main body part and a valve. The analysis controlling function 32 of the processing device 90 outputs a control signal to open the valve to the main body part, in the form of a wireless signal, for example. In response to the control signal output from the processing device 90, the main body part opens the valve. In this situation, the reagent flows into the container 321 from the container 325 via the electromagnetic valve 326.

When the dispensing of the reagent is completed, the analysis controlling function 32 of the processing device 90 outputs, to the driving device 80, a control signal to cancel the connection between the reagent cartridge 300 that has dispensed the reagent and the reagent supply pump unit 330, for example. In this situation, in response to the control signal, the driving device 80 cancels the connection between the top face part 325b of the container 325 of the reagent supply unit 320 in the reagent cartridge 300 and the pump head 330a of the reagent supply pump unit 330.

In the present embodiment, the process of returning the reagent in the container 325 to the container 321 does not necessarily have to be performed every time the reagent is dispensed. For example, the process may be realized as an intermittent operation that is performed after the reagent is dispensed two or more times. Further, in the present embodiment, because the container 325 of the reagent cartridge 300 contains only the small amount of reagent, the process of returning the reagent in the container 325 to the container 321 does not necessarily have to be performed. In other words, when the reagent contained in the container 325 is in an extremely small amount, the reagent in the container 325 may be discarded. In that situation, the electromagnetic valve 326 does not need to be installed.

According to at least one aspect of the embodiments described above, it is possible to inhibit the generation of reagent bubbles and to prevent the reagent from deteriorating due to contact with the air.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reagent container used in an automatic analyzing system configured to measure a liquid mixture of a tested specimen and a reagent, the reagent container comprising:
   a case stored in a reagent storage;
   a bag part that is built in the case, is formed of a resin film, is more flexible than the case, and is configured to contain the reagent;
   an outlet through which the reagent is to be taken out; and
   a barrel part that is attached to the bag part and into which a probe is inserted from a first end side thereof serving as the outlet, the probe being configured to aspirate out the reagent contained in the bag part, wherein
   the barrel part is provided in the bag part so as to stand along an insertion direction of the probe,
   the first end side of the barrel part is exposed from a top part of the bag part,
   the second end side of the barrel part opposite from the first end side is arranged in a center part of a bottom part of the bag part, and the barrel part has a hole formed in a lateral face of the barrel part positioned on the second end side, the hole allowing the reagent to flow between an interior of the barrel part and an inside of the bag part, and
   the bag part becomes deflated in conjunction with the probe aspirating the reagent and the barrel part.

2. The reagent container according to claim 1, wherein a bottom part of the bag part is sloped so as to approach a bottom face part of the reagent storage toward the second end side of the barrel part.

3. The reagent container according to claim 1, wherein a bottom face part of the case is sloped so as to approach, in the bag part, a bottom face part of the reagent storage toward the second end side of the barrel part.

4. The reagent container according to claim 1, wherein
   the barrel part is a flexible tube of which an inside diameter is smaller than an outside diameter of the probe, and
   the barrel part is provided, on the first end side thereof, with a one-way valve configured to prevent inflows in an insertion direction of the probe.

5. The reagent container according to claim 1, wherein the bag part has a part in which an air releasing part is sealed, the air releasing part being to exhaust air from an inside of the bag part when the bag part is filled with the reagent.

6. An automatic analyzing system comprising:
   the reagent container according to claim 1; and
   a reagent dispensing unit configured to aspirate the reagent from the reagent container and to dispense the aspirated reagent into a reaction cuvette.

7. A reagent container used in an automatic analyzing system configured to measure a liquid mixture of a tested specimen and a reagent, the reagent container comprising:
   a case stored in a reagent storage;
   a bag part that is built in the case, is more flexible than the case, and is configured to contain the reagent;
   an outlet through which the reagent is to be taken out; and
   a barrel part that is attached to the bag part and into which a probe is inserted from a first end side thereof serving as the outlet, the probe being configured to aspirate out the reagent contained in the bag part, wherein
   the bag part becomes deflated in conjunction with the probe aspirating the reagent,
   the barrel part is a flexible tube of which an inside diameter is smaller than an outside diameter of the probe, the first end of side of the barrel part is exposed from a top part of the bag part, the second end side of the barrel part opposite from the first end side is arranged in a center part of a bottom part of the bag part, and the barrel part has a hole formed in a lateral face of the barrel part positioned on the second end side, and
   the barrel part is provided with a one-way valve configured to maintain a position of liquid surface of the reagent in the barrel part while closed.

* * * * *